Dec. 22, 1942.  U. CRISTOFOLETTI ET AL  2,305,762
APPARATUS FOR SELF LOADING VEHICLES
Filed March 18, 1938  3 Sheets-Sheet 1
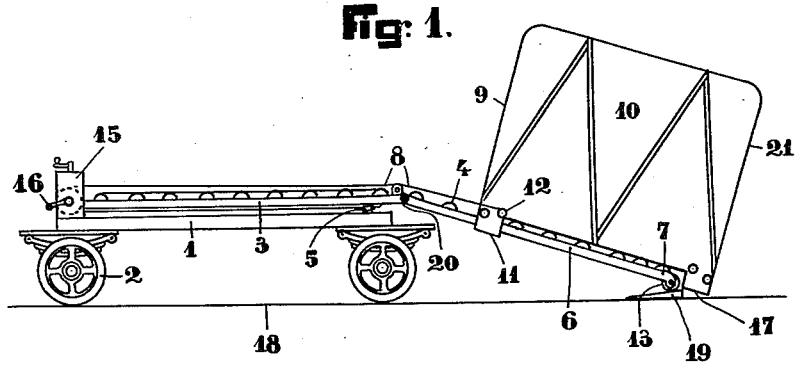
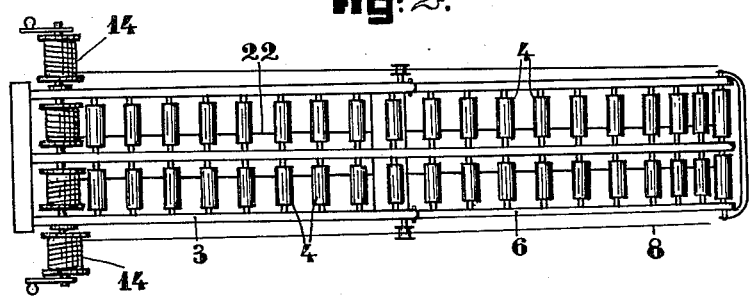
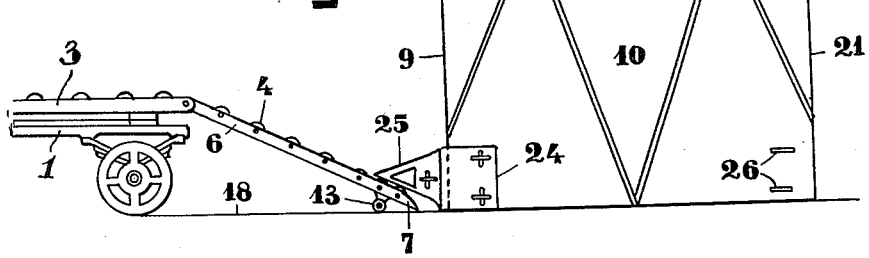
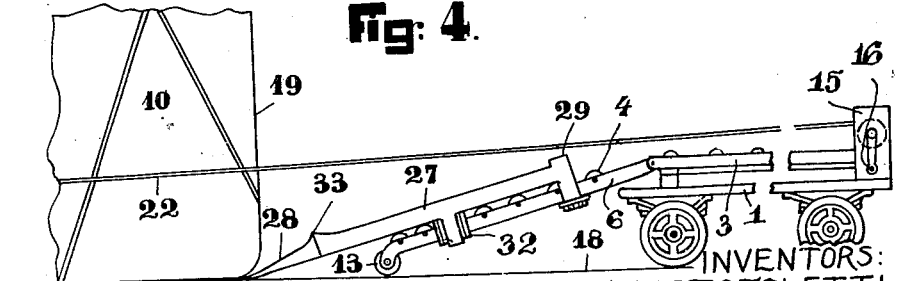
INVENTORS:
UGO CRISTOFOLETTI
LETTERIO LABOCCETTA
ENRICO PERSI
BY Haseltine Lake & Co. ATTORNEYS Dec. 22, 1942.  U. CRISTOFOLETTI ET AL  2,305,762
APPARATUS FOR SELF LOADING VEHICLES
Filed March 18, 1938  3 Sheets-Sheet 2
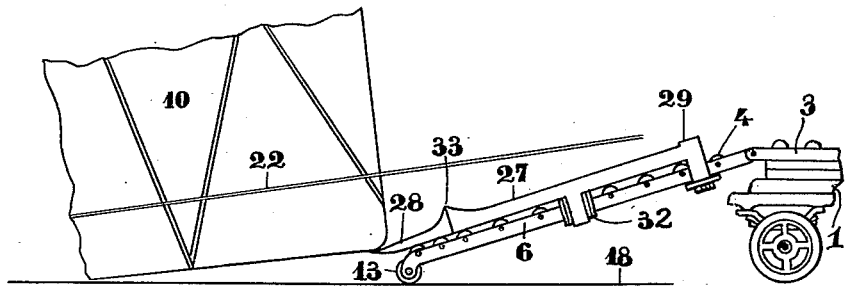
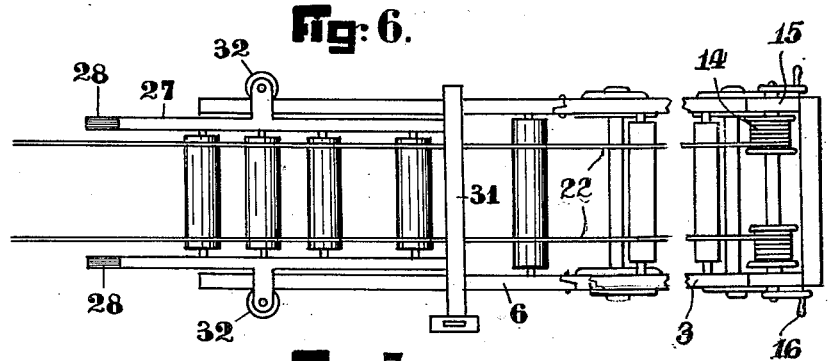
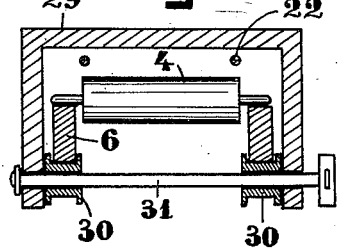
INVENTORS:
UGO CRISTOFOLETTI
LETTERIO LABOCCETTA
ENRICO PERSI
BY Haseltine Lake & Co. ATTORNEYS Dec. 22, 1942.   U. CRISTOFOLETTI ET AL   2,305,762
APPARATUS FOR SELF LOADING VEHICLES
Filed March 18, 1938   3 Sheets-Sheet 3
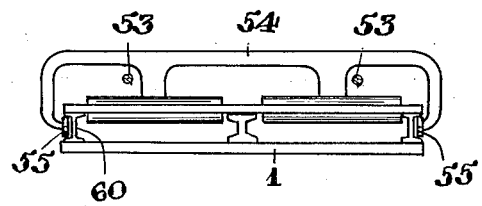
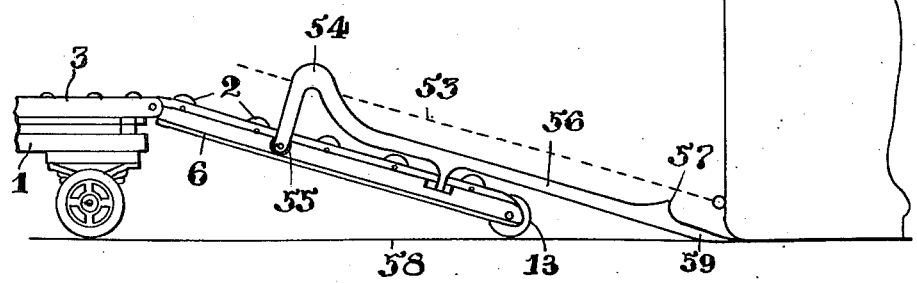
INVENTORS:
UGO CRISTOFOLETTI
LETTERIO LABOCCETTA
ENRICO PERSI
BY Haseltine Lake & Co.   ATTORNEYS Patented Dec. 22, 1942

2,305,762

UNITED STATES PATENT OFFICE 2,305,762

APPARATUS FOR SELF-LOADING VEHICLES

Ugo Cristofoletti, Letterio Laboccetta, and Enrico Persi, Rome, Italy; vested in the Alien Property Custodian Application March 18, 1938, Serial No. 196,646
In Italy March 24, 1937

2 Claims. (Cl. 214—85)

The object of the present invention is a lifting, transference and transporting device adapted to be used with every type of container with or without feet, and moreover, in case of containers provided with feet, the bottom thereof may be lifted as little as possible from the ground level.

According to principles of the present invention, the lifting, transferring and transporting truck need not be applied under the bottom of the case or container for lifting it vertically, but is provided with an inclined plane structure which acts like a wedge and may be introduced under the bottom of said case or container, causing the latter to start rotating about its horizontal side on which the portion of the container opposite to the portion beneath which the wedge is introduced, is in contact with the ground. When the wedge is introduced completely, the bottom of the container lies completely on the inclined plane with one edge resting on the ground. At this moment starts the lifting movement of the container in an oblique direction, along the inclined plane, from which it passes on the horizontal platform of the truck.

At no time the movement of the container occurs in the vertical direction.

In order to facilitate these movements, the front edge of the inclined plane which is to be introduced under the bottom of the container is provided with a roller, rolling on the ground, and the inclined plane itself and the platform of the truck are provided with supporting rollers which eventually co-operate with a transporting moveable ribbon or carpet, adapted to smooth out and to form a continuous surface on which the cases or containers are to slide.

In case of footless containers, the fore edge of the inclined plane could not be introduced under them. In order to do so however, one of the two following methods may be used:

At both the front sides of the cases or containers, under one of which the inclined plane is to be introduced, two triangular shaped plates are introduced, rotatable by means of a hinge about a vertical side so as to be maintained normally flattened against the front or against the lateral side. When the container has to be lifted the two plates placed on the side of the front wall from which the inclined plane is to be introduced, are rotated so as to project in a parallel direction to the side walls. The lower side of the triangles being inclined, the plane introduced below them begins to lift the container, under which thereupon it is introduced.

The arrangement above described may be reversed, as instead of applying the starting plates on to the container, the inclined plane may be provided at its free end with a wedge-like sliding device adapted to penetrate under an ordinary footless container, so as to render subsequently possible the advance of the inclined plane producing the further lifting of the container, said device being detached when the climbing of the container along the inclined plane has commenced.

When using the method just described, comprising an inclined plane detachable from the transporting truck, it is advisable, in order to facilitate the handling of said inclined plane and the displacement of same from a truck to another, to provide means for facilitating the transport of the inclined plane, by one man.

The ready maneuvering of the inclined plane is assured by providing it with two supporting and transporting wheels placed about the middle of its length, at the nearer side of half length, or in a position moveable as desired, according to special circumstances, as hereinafter described, on which wheels the plane becomes horizontal like the platform of a two wheeled car or a gun carriage, being adapted to be moved with the utmost ease.

When the pair of supporting wheels is not placed in correspondence to half the length of the inclined plane, it may be convenient, when desired to use it for transporting the container loaded on it, to provide it with a detachable wheel placed at the furthest end from the axle, so that the carrying inclined plane is transformed during the movement, into a three wheeled truck.

In the accompanying drawings, serving to illustrate schematically the operation of the device according to the invention:

Fig. 1 shows a truck during the lifting operation of a container provided with feet.

Fig. 2 shows in plan a truck and an inclined plane, provided both with sliding rollers.

Fig. 3 shows the method for introducing the inclined plane underneath a container without feet, but provided with starting plates.

Fig. 4 and 5 show the method for introducing below a container without feet, the inclined plane provided with the starting device.

Fig. 6 is a plan view and Fig. 7 is a cross section of the inclined plane structure of the form disclosed in Fig. 4.

Fig. 8 and 9 show details of a modification of the starting device for lifting containers without feet, applied to the inclined plane shown in Fig. 5, shown respectively in end and side elevations.

As shown in the drawings, the truck 1 supported by the wheels 2, carries superposed on it a platform 3 provided with sliding rollers 4, and also at one or both ends carries the supporting means 5 having facilities for changing its height, which makes it possible to regulate its inclination or its height when required.

To one of the ends of the truck, is detachably connected an inclined plane 6 which is provided with rollers 4, and provided also at its free end 7 cut diagonally, with a supporting roller 13 resting on the ground.

In the drawings the truck platform and the inclined plane, are shown provided with two rows of sliding rollers. The first row might be single, and all the rollers or a portion of them, for example those at the lower end of the inclined plane, might be surmounted by a transporting endless ribbon or chain (Fig. 8) in order to form a continuous supporting surface.

The width of the inclined plane is less than the width of the front wall 9 of container 10, so that the former may be introduced between the feet of the latter.

When the end of said plane is introduced under the container, the rings 12 provided thereon are hooked to the ropes 8 which are wound on the drum 14 of a windlass 15 operated by one or two men through the cranks 16.

When the winding of the ropes has been started and the ropes are tensioned, the roller 8 rolls easily on the ground thus facilitating the forward movement or trailing of the inclined plane caused by movement of the truck, thus causing the container to be raised upon the rear edges of its hind feet 17, until the roller 13 has been pushed forward to such an extent as to cause the separation of the feet 17 from the ground 18.

It will be observed that the height of the main portion of the bottom of the container from the ground then no longer depends upon the height of the truck, but it is only required that said height may be sufficient for initially introducing the ends of the inclined plane under said container.

In some cases, it may be sufficient, i. e.; when the containers are placed on railway or motor vans, to reduce the introduction of the inclined plane so that its end 7 may not project beyond the feet 17 before the container is lifted.

For this purpose the roller 13 may be mounted so as to be removed easily and so that it may be replaced with another roller having a different diameter. Use may also be made of a wedge shaped piece 19 which is introduced under the container (Fig. 1).

After the container has been lifted from the ground, the truck is stopped and is locked, and in continuing to operate the windlass, the container climbs firstly over the inclined plane and thence is brought on the platform 3.

The truck 1 need not be very high, in fact it is preferable to build it as low as possible in order to decrease the lifting effect demanded by it. However, in order that the diameter of the wheels may not be reduced unduly, the distance between the wheels of each pair may be made greater than the width of the container, and to provide wheels of such a diameter so that they project at a higher level than that of platform 3, so that the container on the truck, may be placed between said pair of wheels.

When the container has to be transported to a considerable distance, the inclined plane may be lifted by rotating it round the hinge of its articulation 20, and then causing it to rest against the rear wall 21 of the container, or by detaching it altogether; the same plane being also usable for a number of trucks at the point of loading and unloading.

For the unloading operation, it is necessary to push the container towards the inclined plane, and in order to do this, a second pair of ropes or chains 22 may be used, secured to the rings 24 provided on the rear feet, which ropes, suitably guided, are wound on drums 23, while from drums 14, the ropes 8 are unwound. When the container arrives over the inclined plane, the drums 23 are set free and the ropes 8 become tensioned for braking the descent of the container over the inclined plane.

The movement of the container may also be started by adjusting the supports of the platform 3 so as to cause said platform to be inclined towards the end of the inclined plane 6, which is rotatably connected to it.

In the case of a container without feet, shown in Fig. 3, by means of connecting plates 24, starting plates 25 are secured in correspondence to the four vertical edges of the container, said plates 25 having a triangular shape and being adapted to rotate by means of a hinge round their vertical side. Such plates 25 when disposed as shown in Fig. 3, serve to allow the entrance of the inclined plane producing the lifting of the container.

During the conveyance of the container, the triangles 25 are disposed against the walls 9 and 21.

Said triangular plates 25 may also form a single piece integral with the plates 24; and the containers may be provided on their front walls 9, and 21, and on their side walls, with means 26 adapted to grip the starting plates when it is required to do so. By adopting this arrangement, it is sufficient to provide a number of plates at the loading and unloading points so as to be used with any number of trucks.

The above described device for lifting containers not provided with feed may be reversed by applying the starting device on the inclined plane instead of on the container, which latter in this case need not be provided with a starting device.

As shown in Figures 4 to 7, this additional starting device to be applied for a moment to the free end of the inclined plane 6, comprises two levers 27 the ends of which are shaped as chisel points 28, and are connected by an inverted U shaped cross piece 29. Between the lower ends of the arms of said cross piece, guide rollers 30 are provided, adapted to roll under the sides of frame 6 by rotating on a shaft 31 passing through said arms. In order to insure a greater steadiness of movement, more rollers 32 may be added, rotatable round vertical axes and adapted to slide on the two sides of the frame.

It will now be easy to understand that, as shown in Fig. 4, by starting to introduce under the lower edge of the front wall 19 of the containers the two chisel points 28 of levers 27, and after having secured the ropes 22 to the rings provided on the container and winding said ropes round it, or, by stretching the ropes by means of the windlass, the inclined plane is caused to be pushed forward by rotating the container on its rear edge as shown in Fig. 5.

After the above described operation, the inclined plane may be introduced under the container, while the starting device guided by the rollers 30 and 32 slides backwards over it, as it is pushed by the container which rests against the stop notch 33.

When the container lies completely on the inclined plane, it is necessary to take away the starting device, which operation is made by drawing out the shaft 31, while the two points 28 are inserted between two successive rollers 4. The rollers 30 consequently drop down, and by pushing upwards the cross piece 29, the whole device may thus be detached from the inclined plane.

The operation is then proceeded with further as in the case above described for lifting the container provided with feet.

The details of the starting device used in connection with the inclined plane of Fig. 5 for lifting containers without feet are better shown in Figures 8 and 9 showing that said device consists substantially of a cross piece 54 with a pair of levers 56, the ends 59 of which being chisel shaped, may be introduced under the case or container to be lifted up to the stop notch 57. This device is guided by rollers 55 provided on the cross piece 54, said rollers running in the grooves of I beams forming the sides of frame 6.

It will be clear from the preceding description that the inclined plane provided with wheels is not only a device adapted for the ready and handy transportation of containers with motor vans, but may itself act as a freight car which may be trailed by mechanical or animal power, or even by hand in warehouses or in stations; it is adaptable on vehicles of any height; it acts as a bridge for transferring containers from railway trucks or from motor vans to loading platforms and vice versa by compensating the differences of level, and lastly, it provides a unit for handling readily the freight both on short and long distances, without requiring the cooperation of outside elements either for loading or for unloading cases or containers, for which operations it is provided with its own means.

The truck has been shown in the drawings without a motor. It is readily understood however that the truck according to the invention may be provided with an electric motor, or with a battery of accumulators, or with an internal combustion motor.

When the truck is provided with a motor, it may draw along one or more single trucks as trailers, according to the conditions of the road, said trailing motor serving also for operating the windlasses.

We claim:

1. In apparatus for loading a container on a self-loading vehicle consisting of a truck, an inclined plane member articulated to the truck, a sustaining roller disposed under the free or trailing end of said inclined plane member by which it can readily ride over the ground, and traction means provided on the truck for connecting the same with the container and causing this latter to ascend the inclined plane member while the plane member is introduced under its bottom, the features including facilities for lifting containers without feet comprising a device having a pair of levers having wedge shaped ends adapted to be introduced under the bottom of the container, cross pieces connecting said levers; guide rollers for maintaining the connection with the inclined plane member, upon introduction of the same under said container, and roller shaft means of sufficient length to allow the device to be detached from the inclined plane member when the container is disposed over it.

2. In apparatus for loading a container on a self-loading vehicle consisting of a truck, an inclined plane member articulated to the truck, a sustaining roller disposed under the free or trailing end of said inclined plane member by which it can readily ride over the ground, and traction means provided on the truck for connecting the same with the container and causing this latter to ascend the inclined plane member while the plane member is introduced under its bottom, the features including a windlass with two pairs of drums mounted on shafts and two pair of ropes, said drums being capable of being made fast or loose on their shafts and said windlass serving to wind one pair of ropes in one direction, while the other pair is unwound for the purpose of lifting and unloading the container.

UGO CRISTOFOLETTI.
LETTERIO LABOCCETTA.
ENRICO PERSI.